April 11, 1967 J. J. FRANTZEN 3,313,223

ENDLESS BELT FILM FOR MAKING PHOTOPRINTED REPRODUCTIONS

Filed March 24, 1965

INVENTOR
JOHN J. FRANTZEN
BY Stryker and Jacobson
ATTORNEYS 3,313,223
Patented Apr. 11, 1967

3,313,223

ENDLESS BELT FILM FOR MAKING PHOTO-PRINTED REPRODUCTIONS

John J. Frantzen, St. Paul, Minn., assignor to Buckbee-Mears Company, St. Paul, Minn., a corporation of Minnesota Filed Mar. 24, 1965, Ser. No. 442,411
3 Claims. (Cl. 95—1)

This invention relates generally to the field of contact photoprinting. More particularly the invention is directed toward contact photoprinting a repetitive pattern from a master onto a continuously moving strip of material. Specifically, the invention is concerned with the construction of the master in the form of an endless belt of photographic film carrying the pattern to be reproduced.

In the mass production of articles using well-known photoprinting techniques, as is done for example, in the production of printed circuits for electrical equipment and the like, it is often required to reproduce large quantities of the identical circuit. This may be done in various ways. Most commonly, this has been done by bringing a strip of metallic material or a metallic covered insulating material which has been previously coated with a suitable light sensitive enamel or the like, into a photoprinting location where a master plate, either a negative or a positive, is placed over a section of the coated metal in contact therewith. The metal is then subjected to a photoprinting step wherein an actinic light source is energized for a suitable period of time to photoprint the desired circuit pattern which is carried by the master plate onto the coated metal. After a suitable exposure time, the light is turned off, the master plate is drawn away from the metal and the strip is moved forward until another unexposed section is brought into position. Again the master plate is brought into contact and the photoprinting step is repeated. This stop-and-go manner of operation is continued until the desired number of printed circuits have been produced. In due course, after the photoprinting step, the exposed strip of material is subjected to further well known processing steps by which the desired printed-circuit pattern is formed. It can be visualized that the production rate of this manner of production may not be as great as desired since not only the stop-and-go operation slows down production, but also for each photoprinting step the master plate must be drawn down tightly onto the metal to ensure intimate contact therewith to achieve the degree of precision which is generally required of the circuits produced in this manner. To increase the rate of production generally multiple photoprinting stations are used so that multiple prints can be made concurrently.

To alleviate some of the shortcomings of this manner of production, there has been developed recently a method whereby the strip of material upon which the pattern is to be reproduced can be kept continuously moving during the contact photoprinting step. This is done by making the negative or positive master, which contains the printed circuit pattern, in the form an endless belt. Generally, the master is a strip of photographic film containing clear and opaque areas which defines the pattern of the circuit to be reproduced. It is the general object of this invention to provide an endless belt master for use in contact photoprinting of repetitive circuit patterns.

One of the principal difficulties encountered heretofore in the construction of an endless belt film as a photographic master has been that when the ends of the strip of film are joined together to form the endless belt, there results a line indicating a discontinuity. This line is then undesirably reproduced during the photoprinting operation. It is a specific object of this invention to provide an endless belt master for contact photoprinting which contains no apparent discontinuities.

In order to obtain the degree of precision normally required in printed circuits of the type with which this invention is concerned it is of utmost importance that the photographic master make intimate, flat and uniform contact with the material on which the pattern is to be reproduced. It is a further object of this invention to provide an endless belt master for use in contact photoprinting which can be held in uniform and intimate contact with the material upon which the printing is being done over the entire printing area during the photoprinting step.

Yet another object of this invention is to provide an endless belt photographic film for use as a master in contact photoprinting which lends itself to use in the mass production of printed circuits in an efficient manner.

Still another object of this invention is to provide an endless belt photographic master used in contact photoprinting reproduction work which is relatively inexpensive to construct.

Yet a further object of this invention is to provide a master for use in an improved process for producing large quantities of photographically reproduced repetitive patterns.

These and other objects and features of this invention will become apparent during the course of the following detailed description, reference being had to the accompanying drawings in which.

Figure 1:
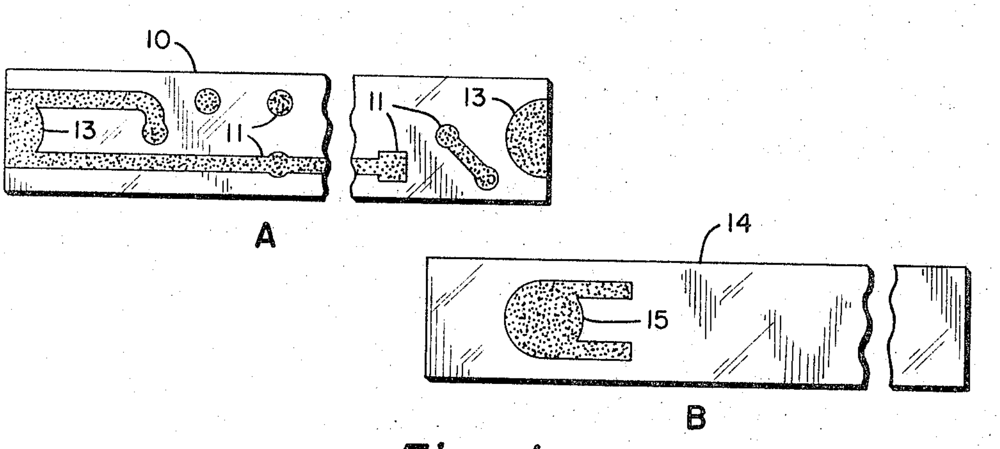
FIGURE 1 illustrates the two layers of photographic film in an endless belt embodiment of the invention constructed according to the teachings of this invention.

In FIG. 1A, a first strip of film 10 is shown containing various shaded areas generally designated 11, which define certain printed circuit patterns which are to be reproduced on a strip of material. For illustrative purposes only, these patterns can be considered to consist essentially of elongated electrical circuit conductors for an electrical printed circuit board along with mounting or contact pads such as circular pad 13.

In FIG. 1B there is shown a second strip of photographic film 14 which is, for the most part, transparent but contains a small section of shaded areas 15 which are identical to the circuit-defining shaded areas over a corresponding section of the first strip of film 10. In other words, the pads 13 along with a small portion of the attached conductors which appear at the ends of the strip of film 10 are duplicated on film strip 14 between its ends. The two strips 10 and 14 are of the same height and their lengths are virtually equal, there being a slight difference to compensate for the thickness of strip 10 when the two strips are bonded together, as will be shortly described. Although preferably the strips of film are of the same thickness, it will become apparent that except for practical considerations, the film thickness is a matter of choice and does not play a part in the instant invention.

Figure 2:
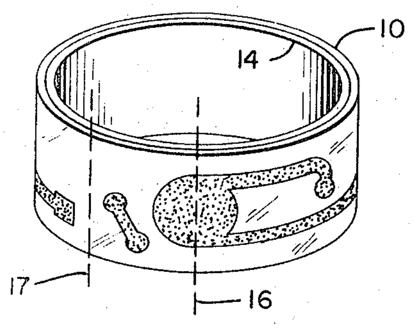
FIG. 2 is an embodiment of the invention constructed according to the teachings of the invention from the two layers illustrated in FIG. 1.

To make the strip 10 into an endless belt configuration, the two ends would normally be butted against one another and permanently joined together, such as with a suitable adhesive. It can be seen that there results a transverse discontinuity line where the two ends are joined which line normally would be undesirably reproduced during the usual photoprinting operation. To overcome this, the second strip of film 14 is brought into overlying relationship with strip 10 with the shaded areas 15 precisely superimposed over the corresponding portions contained in strip 10. In this manner then, no discontinuity line appears through the pad 13, so the pad and the entire circuit appears continuous and will be reproduced as such by the photoprinting operation. The strip 14 is coiled in a manner identical to that of strip 10 with its ends joined together. In this fashion it constitutes the inner layer of the endless belt and has the same overall breadth as the outer layer of film 10. The two layers are bonded together by a thin coating of transparent adhesive. The article which is formed in this manner is illustrated in FIG. 2. As earlier stated, since strip 14 is the inner layer, it will be slightly shorter than strip 10 by an amount determined by the thickness of strip 10. Dashed line 16 in FIG. 2 merely indicates where the two ends of strip 10 have been joined together and dashed line 17 merely indicates where the two ends of strip 14 have also been joined. It is preferable to form the duplicated pattern on the superimposing strip 14 at a location such that the joint of the two ends of the latter strip will be located with respect to film strip 10 in an area which will likely not be affected in the event that the line defined by these joined ends were photographically reproduced. As will be shortly pointed out, there is little likelihood of that occurring because strip 10 contains the entire pattern and is the one which is brought into contact with the material on which the photoprinting is to take place.

Figure 3:
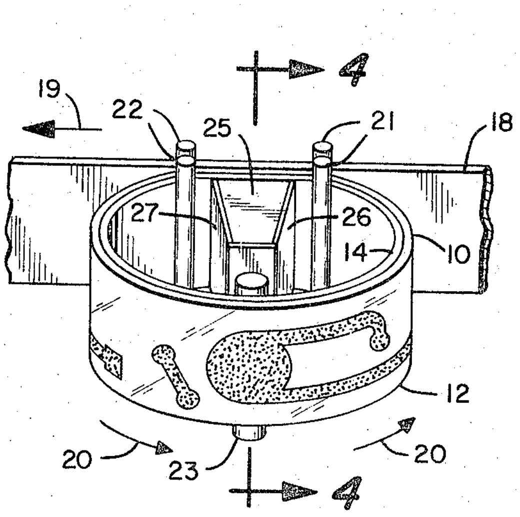
FIG. 3 illustrates somewhat in simplified schematic form the manner in which the embodiment shown in FIG. 2 is used in a contact photoprinting process.
Figure 4:
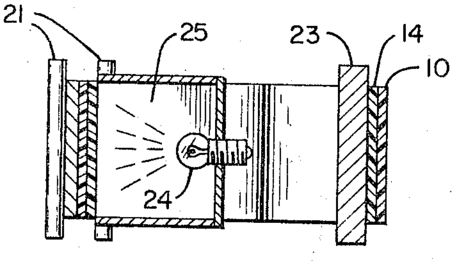
FIG. 4 is a more detailed view of the apparatus illustrated in FIG. 3 as viewed along section line 4—4 of FIG. 3.

FIGS. 3 and 4 illustrate in some detail a typical manner of use of the endless film master which is constructed according to the teachings of this invention. The strip of the material 18 on which the pattern is to be reproduced may be a flexible strip of metallic material, such as copper or copper coated Mylar, or may even be a rigid metallic or metallic coated material. The front face of strip 18 is normally precoated with a suitable light-sensitive material and the strip is continuously moved in the direction illustrated by arrow 19. The endless belt photographic film master, generally denoted as 12, constructed from the two layers 10 and 14, is continuously driven in the direction of arrow 20 by two sets of pinching drive rollers 21 and 22 which may be driven by any convenient motive source. These two sets of driving rollers also direct the movement of strips 18 with the film master 12 being held in contact with the strip between the two sets of drive rollers. Additional means may be provided to ensure that the master is held in close and uniform contact with the strip 18. For example, pressurized air may be applied to opposite sides of the strip and film forcing them toward each other in the area between the sets of driving rollers. The path of the endless belt master 12 after it passes through the set of rollers 22 is out and around an idler guiding roller 23.

A suitable light source 24 is located within an enclosed chamber 25. Only that area of the endless belt master 12 and the strip 18 which is between the walls 26 and 27 of the chamber 25 is exposed to the light from source 24. As the endless belt 12 and the strip 18 are continuously moved by the action of the rollers 21 and 22, the pattern contained on the outer strip of film 10 is printed on the light-sensitive coating of strip 18 by the action of the light from source 24 as the strip passes across the opening of the chamber 25. The photographic master 12 and the strip of material 18 are kept in intimate and uniform contact during this part of their travel and the velocity and light intensity are such that the strip is exposed to the light for a sufficient period of time to photoprint the pattern on the light sensitive coating. The strip 18 is subsequently subjected to further treatment to develop out the pattern which has been printed thereon by the master. The same pattern is continuously and repetitively photoprinted on contiguous sections of strip 18 as it travels past the photoprinting location.

It should be noted that by making the inner layer 14 of the endless belt master 12 coextensive with the outer layer 10 which contains the pattern to be reproduced, there are no humps or other irregularities which might prevent the uniform and intimate contact with the strip 18 which is so necessary during the photoprinting step. Further, the double layer thickness of the endless belt gives it added strength resulting in longer life expectancy keeping replacement at a minimum.

It should be understood that the manner of using the endless belt photographic master as illustrated in FIGS. 3 and 4 is only illustrative and not limitative. Obviously there are a large number of ways in which this endless belt could be utilized. It should be kept in mind that the layer which contains the entire pattern to be reproduced, layer 10 in the illustrated embodiment, should be the one which contacts the material on which the pattern is being photoprinted. Otherwise, some precision may be lost in the reproduction. If it is contemplated, for example, to locate the material on which the photoprinting is to take place inside of the endless belt master, the relative positions of the two layers, such as 10 and 14, should be reversed.

Materials from which the two strips of film, 10 and 14, are made and the process for forming the patterns to be reproduced on these strips are well known to those skilled in the art and do not constitute a part of the instant invention. Also, adhesives which are suitable for use in the manner described are likewise well known. It should also be understood that the types and variety of patterns which can be reproduced using endless belt masters of the type and in the manner described herein are not intended to be limitive and have been shown for illustrative purposes only.

I claim:

1. An endless-belt photographic film containing clear and opaque areas defining a pattern to be photographically reproduced constructed of a first layer of a strip of film having its ends butted and joined together with the patterns at the ends aligned so that the pattern appears continuous; and a second layer of a strip of photographic film coextensive with the first layer and bonded thereto breadthwise by a coating of clear adhesive, the second layer strip being clear throughout except for a section which overlies the butted ends of the first layer strip, said section containing a duplicate of the pattern contained on the corresponding section of the first layer strip and being in exact registry therewith.

2. An endless-belt photographic film, comprising: a first layer of a strip of photographic film containing clear and opaque areas defining a pattern to be repetitively reproduced by contact photoprinting, the ends of the first layer being buttedly joined together with the patterns at the ends aligned to appear continuous; and a second layer of a strip of photographic film coextensive with the first layer and permanently bonded thereto with a thin coating of transparent adhesive, said second layer film being clear throughout except for a section overlying the butted ends of the first layer, said section containing a duplicate of the pattern contained in the corresponding section of the first layer and in exact registration therewith.

3. A process for making an endless belt of photographic film for use in repetitively reproducing a pattern by contact photoprinting, comprising the steps of:

(a) joining together in butting relationship the ends of a first strip of photographic film containing a pattern to be reproduced with the pattern at the ends aligned to appear continuous;

(b) overlaying the first strip of film with a coextensive second strip of film which is transparent throughout except for a small section containing a pattern which is identical to that appearing at the joined ends of the first strip;

(c) registering the second strip with the first strip by superimposing the corresponding patterns of the two strips; and (d) bonding the two strips together throughout their breadth.

References Cited by the Examiner

UNITED STATES PATENTS

| | | | |
|---|---|---|---|
| 15,103 | 5/1821 | Snow | 95—1 |
| 2,073,313 | 3/1937 | Murray | 96—36 X |
| 3,155,505 | 11/1964 | Shannon | 96—36 X |
| 3,172,115 | 3/1965 | Jeffee | 352—235 |

NORTON ANSHER, *Primary Examiner.*

R. M. SHEER, *Assistant Examiner.*